(12) United States Patent
He et al.

(10) Patent No.: US 12,307,797 B2
(45) Date of Patent: May 20, 2025

(54) METHOD FOR RECOGNIZING RECEIPT, ELECTRONIC DEVICE AND STORAGE MEDIUM

(71) Applicant: BEIJING BAIDU NETCOM SCIENCE TECHNOLOGY CO., LTD, Beijing (CN)

(72) Inventors: Huihui He, Beijing (CN); Jiayang Wang, Beijing (CN); Yubo Xiang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 462 days.

(21) Appl. No.: 17/898,678

(22) Filed: Aug. 30, 2022

(65) Prior Publication Data
US 2023/0282016 A1    Sep. 7, 2023

(51) Int. Cl.
*G06V 30/19*   (2022.01)
*G06N 3/08*    (2023.01)
*G06T 9/00*    (2006.01)

(52) U.S. Cl.
CPC ......... *G06V 30/19187* (2022.01); *G06N 3/08* (2013.01); *G06T 9/002* (2013.01); *G06V 30/19147* (2022.01); *G06V 30/1916* (2022.01)

(58) Field of Classification Search
None
See application file for complete search history.

(56) References Cited

U.S. PATENT DOCUMENTS

| | | | |
|---|---|---|---|
| 11,393,233 B2 * | 7/2022 | Tata | G06F 18/21 |
| 11,410,446 B2 * | 8/2022 | Shanmuganathan | G06V 10/457 |
| 2021/0248367 A1 * | 8/2021 | Gal | G06V 10/454 |
| 2021/0256052 A1 * | 8/2021 | Luo | G06N 3/045 |
| 2021/0334606 A1 * | 10/2021 | Du | G06F 18/29 |

* cited by examiner

*Primary Examiner* — Leon Flores
(74) *Attorney, Agent, or Firm* — Lippes Mathias LLP (57) ABSTRACT

Provided are method for recognizing a receipt, an electronic device and a storage medium, which relate to the fields of deep learning and pattern recognition. The method may include: a target receipt to be recognized is acquired; two-dimensional position information of multiple text blocks on the target receipt respectively is encoded, to obtain multiple encoding results; graph convolution is performed on the multiple encoding results respectively, to obtain multiple convolution results; and each of the multiple convolution results is recognized based on a first conditional random field model, to obtain a first prediction result at text block-level of the target receipt, wherein the first conditional random field model and a second conditional random field model are co-trained, so as to obtain a second prediction result at token-level of the target receipt.

20 Claims, 4 Drawing Sheets

| Project specification | Quantity | Unit price | Total price | Account receivable |
|---|---|---|---|---|
| Project specification | Quantity | Unit price | Total price | Account receivable |
| one | One person | 15.00 | 15.00 | 15.00 (1) |
| one | One person | 15 . 00 | 1 5 . 0 0 | 15 . 00 (1) |

METHOD FOR RECOGNIZING RECEIPT, ELECTRONIC DEVICE AND STORAGE MEDIUM

CROSS REFERENCE TO RELATED APPLICATIONS

The present disclosure claims priority of Chinese Patent Application No. 202210211125.3, filed on Mar. 3, 2022 and named "Method and Apparatus for Recognizing Receipt, Electronic Device and Storage Medium". Contents of the present disclosure are hereby incorporated by reference in its entirety of the Chinese Patent Application.

TECHNICAL FIELD

The present disclosure relates to the fields of deep learning and optical character recognition (OCR), and in particular to a method for recognizing a receipt, an electronic device and a storage medium.

BACKGROUND

At present, a certain number of entry staff are usually trained to enter receipt information as required, so as to reduce human errors in extracting structured information from at least one receipt. However, manual entry is strenuous, boring, time-consuming and labor-consuming.

SUMMARY

The present disclosure provides a method for recognizing a receipt, an electronic device and a storage medium.

According to one aspect of the present disclosure, a method for recognizing a receipt is provided. The method may include: a target receipt to be recognized is acquired, wherein the target receipt may include multiple of text blocks; two-dimensional position information of the multiple text blocks on the target receipt is encoded respectively, to obtain multiple encoding results, wherein the multiple encoding results are corresponding to the multiple text blocks in a one-to-one manner; graph convolution on the multiple encoding results is performed respectively, to obtain multiple convolution results, wherein the multiple convolution results are corresponding to the multiple encoding results in a one-to-one manner; and each of the multiple convolution results is recognized based on a first conditional random field model, to obtain a first prediction result at text block-level of the target receipt, wherein the first conditional random field model and a second conditional random field model are co-trained, the second conditional random field model is configured to recognize each of the multiple convolution results, so as to obtain a second prediction result at token-level of the target receipt.

According to another aspect of the present disclosure, an electronic device is also provided. The electronic device may include: at least one processor; and a memory in communication connection with the at least one processor, wherein the memory stores at least one instruction capable of being executed by the at least one processor, and the at least one instruction is performed by the at least one processor, so as to enable the at least one processor to perform the following steps: a target receipt to be recognized is acquired, wherein the target receipt may include multiple of text blocks; two-dimensional position information of the multiple text blocks on the target receipt is encoded respectively, to obtain multiple encoding results, wherein the multiple encoding results are corresponding to the multiple text blocks in a one-to-one manner; graph convolution on the multiple encoding results is performed respectively, to obtain multiple convolution results, wherein the multiple convolution results are corresponding to the multiple encoding results in a one-to-one manner; and each of the multiple convolution results is recognized based on a first conditional random field model, to obtain a first prediction result at text block-level of the target receipt, wherein the first conditional random field model and a second conditional random field model are co-trained, the second conditional random field model is configured to recognize each of the multiple convolution results, so as to obtain a second prediction result at token-level of the target receipt.

According to another aspect of the present disclosure, a non-transitory computer-readable storage medium which stores a computer instruction is also provided, wherein the computer instruction is configured to enable a computer to perform the following steps: a target receipt to be recognized is acquired, wherein the target receipt may include multiple of text blocks; two-dimensional position information of the multiple text blocks on the target receipt is encoded respectively, to obtain multiple encoding results, wherein the multiple encoding results are corresponding to the multiple text blocks in a one-to-one manner; graph convolution on the multiple encoding results is performed respectively, to obtain multiple convolution results, wherein the multiple convolution results are corresponding to the multiple encoding results in a one-to-one manner; and each of the multiple convolution results is recognized based on a first conditional random field model, to obtain a first prediction result at text block-level of the target receipt, wherein the first conditional random field model and a second conditional random field model are co-trained, the second conditional random field model is configured to recognize each of the multiple convolution results, so as to obtain a second prediction result at token-level of the target receipt.

It should be understood that the content described in this section is not intended to identify key or important features of the embodiments of the present disclosure, nor is it intended to limit the scope of the present disclosure. Other features of the present disclosure will be easily understood through the following specification.

BRIEF DESCRIPTION OF THE DRAWINGS

The accompanying drawings are configured to better understand the solution and are not to be construed as limiting the present disclosure. In the accompanying drawings.

DETAILED DESCRIPTION OF THE EMBODIMENTS

The following description of examples of the present disclosure, made in combination with the accompanying drawings, may include various details of embodiments of the present disclosure so as to assist in understanding, which should be considered exemplary only. Therefore, those skilled in the art should realize that various changes and modifications may be made to the embodiments described herein without departing from the scope and spirit of the present disclosure. Moreover, descriptions of well-known functions and structures are omitted in the following description for clarity and conciseness.

A method for recognizing a receipt in an embodiment of the present disclosure is further introduced below.

Figure 1:
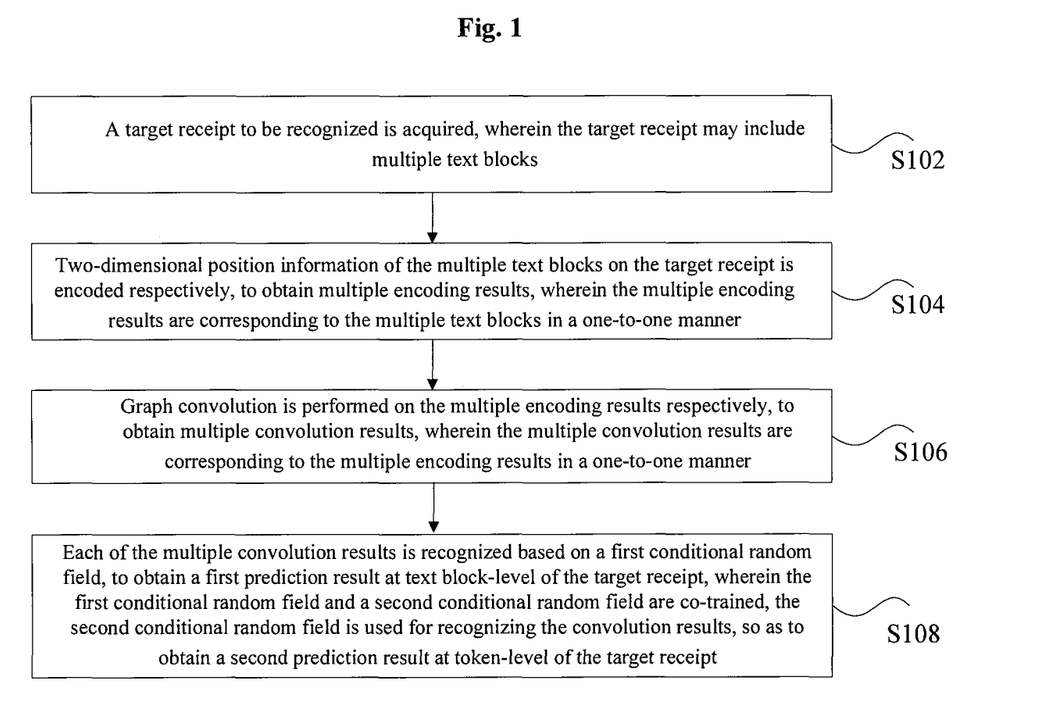
FIG. 1 is a flowchart of a method for recognizing a receipt according to an embodiment of the present disclosure.

FIG. 1 is a flowchart of a method for recognizing a receipt according to an embodiment of the present disclosure. As shown in FIG. 1, the method may include the following steps.

At step S102, a target receipt to be recognized is acquired, wherein the target receipt may include multiple text blocks.

In the technical solution provided in the above step S102 of the present disclosure, the target receipt may be a bank receipt, for example, when the target receipt to be recognized is acquired, a picture of a bank receipt to be recognized may be obtained.

In this embodiment, the target receipt may incorporate multiple text blocks, and each of the multiple text blocks is composed of multiple characters.

At step S104, two-dimensional position information of the multiple text blocks on the target receipt is encoded respectively, to obtain multiple encoding results, wherein the multiple encoding results are corresponding to the multiple text blocks in a one-to-one manner.

In the technical solution provided in the above step S104 of the present disclosure, the two-dimensional position information on the target receipt may be two-dimensional coordinate information of each of the multiple text blocks, and each of the encoding results may be a hidden layer output (token_hidden) at token-level. When the two-dimensional position information of the multiple text blocks on the target receipt is encoded respectively, to obtain the multiple encoding results, for example, the two-dimensional position information of the multiple text blocks on the target receipt may be encoded at an encoder of a model, to obtain the hidden layer output at token-level (token_hidden).

For example, when the two-dimensional position information of the multiple text blocks on the target receipt is encoded respectively, to obtain the multiple encoding results, the multiple text blocks (text_segments $\in R^{B \times N \times T}$) on the target receipt may be transformed into an vector representation at token-level (text_emb $\in R^{B \times N \times T \times D}$) firstly by looking up in a word vector table, and then a sub-image (image_segment) corresponding to each of the multiple text blocks is encoded by a convolutional neural network (CNN), to obtain an vector representation of the sub-image (image_emb $\in R^{B \times N \times D}$). The two-dimensional coordinate information of each of the multiple text blocks may be $\{x_0, y_0, x_1, y_1\}$, wherein $(x_0, y_0)$ and $(x_1, y_1)$ are coordinate of an upper left corner and a coordinate of a lower right corner of a text box of each of the multiple text blocks respectively. A two-dimensional coordinate vector bbox_emb $\in R^{B \times N \times D}$ of each of the multiple text blocks is obtained by summing a coordinate vector corresponding to the upper left corner and a coordinate vector corresponding to the lower right corner. An abscissa X and an ordinate Y are initialized respectively to obtain a corresponding coordinate vector table, and vector representation corresponding to the coordinates is obtained by looking up the coordinate vector table. In this way, obtained text_emb is at token-level, image_emb and bbox_emb is at text block granularity (node granularity), $R^{B \times N \times D}$ is expanded into $R^{B \times N \times T \times D}$ by expanding image_emb and bbox_emb, and finally, a sum of the above three expanded vectors (emds) is taken as an input of a transformer, to obtain the hidden layer output token_hidden $\in R^{B \times N \times T \times D}$ at token-level.

At step S106, graph convolution is performed on the multiple encoding results respectively, to obtain multiple convolution results, wherein the multiple convolution results are corresponding to the multiple encoding results in a one-to-one manner.

In the technical solution provided in the above step S106 of the present disclosure, essence of convolution is F(WX+b), wherein X represents an input vector, F represents an activation function, W represents a weight of a convolution kernel, b represents a bias term. Core idea of graph convolution is F(AXW), wherein A represents an adjacent matrix of a graph and is configured to represent a weight of edges between nodes, that is to say, a connection relation between the nodes. When X*=AX, then the graph convolution may be that each of the nodes acquires information transmitted from at least one neighbor-node, and then updates each of the nodes after summarizing the information.

In this embodiment, the graph convolution may be performed on the multiple encoding results respectively, to obtain the multiple convolution results, wherein the multiple convolution results are corresponding to the multiple encoding results in a one-to-one manner. For example, after a target receipt input into a model is encoded by an encoder, a hidden layer representation token_hidden $\in R^{B \times N \times T \times D}$ at token-level is obtained. Hidden layer representations of words of a bounding box (bbox) of the same one text block are added together, to obtain an vector representation node_hidden $\in R^{B \times N \times D}$ of the text block. Final node graph convolution output node_hidden$^{l+1} \in R^{B \times N \times D}$ is obtained by performing multi-layer graph convolution on the vector representation.

In this embodiment, graph convolution learning may use a self-supervised loss function, and a meaning of the loss function is as follows: when a distance between two nodes is relatively large, then relation weight $A_{ij}$ between the two nodes will be relatively small. Optionally, by taking $v_i$ and $v_j$ to represent an vector representation of an i node and an vector representation of a j node in node_hidden$^{l+1}$ respectively, the loss function may be as follows:

$$\text{loss}_{graph\_conv} = \sum_{i,j=1}^{N} \exp(A_{ij} + \eta \|v_i - v_j\|_2^2) + \gamma \|A\|_F^2$$

$$\sum_{j=1}^{N} A_{ij} = 1, A_{ij} \geq 0$$

wherein $\gamma$ represents a hyperparameter, and loss_(graph_conv) being may be set in advance, for example, may be set as 0.1.

In this embodiment, the hidden layer representations of words in the bbox of the same one text block (encoding result) are added together, to obtain the vector representation of the text block, node_hidden $\in R^{B \times N \times D}$, and final graph convolution output (convolution result) is obtained by performing the multi-layer graph convolution on the vector representation of the text block.

At step S108, each of the multiple convolution results is recognized based on a first conditional random field model, to obtain a first prediction result at text block-level of the target receipt, wherein the first conditional random field model and a second conditional random field model are co-trained, the second conditional random field model is configured to recognize the convolution results, so as to obtain a second prediction result at token-level of the target receipt.

Optionally, the first prediction result is configured to represent structured information corresponding to keywords of the target receipt.

In the technical solution provided in the above step S108 of the present disclosure, the first conditional random field model and the second conditional random field model are co-trained. For example, at a prediction end of a model, a double-layer conditional random field (CRF) structure may be used, which is composed of a conditional random field model at token-level (token CRF) and a CRF model at node-level (node CRF). The two conditional random field models are configured to recognize each of the multiple convolution results respectively to obtain a first prediction result at text block-level of the target receipt and a second prediction result at token-level of the target receipt.

For example, each of the multiple convolution results is recognized, Optionally, node_hidden$^{l+1}$ output by a node graph convolution is expanded to be at token-level, and node_hidden$^{l+1}$ at token-level is added to the hidden layer vector at token-level to be determined as an input of a bi-directional long short-term memory (BiLSTM) network. Through a BiLSTM network, a final hidden layer representation at token-level token_final_hidden$\in R^{B \times N \times T \times D}$ is obtained from the input and the final hidden layer representation is sent to the token CRF network to obtain a prediction result at token-level token_crf_outputs$\in R^{B \times N \times T}$, then, the final hidden layer representation at token-leveltoken_final_hidden in the same one text block is summed, to obtain a corresponding text block vector representation, which may also be named as a word vector representation node_final_hidden$\in R^{B \times N \times D}$, and then the text block vector representation is sent to the node CRF network, to obtain a prediction result at node-level node_crf_outputs$\in R^{B \times N}$.

In this embodiment, the first prediction result may be configured to represent structured information corresponding to keywords of the target receipt. The structured information may be a structured result incorporating a specific field. Each of the multiple convolution results is recognized based on the first conditional random field model, to obtain the first prediction result at text block-level of the target receipt. For example, at a prediction end of a model, a conditional random field model in double-layer structure, which is composed of a conditional random field model at token-level (token CRF) and a CRF network at node-level (node CRF), may be configured to recognize each of the multiple convolution results, to obtain the structured result of the specific field of the target receipt.

In this embodiment, each of the multiple convolution results is recognized based on the first conditional random field model, to obtain the first prediction result at text block-level of the target receipt. The second conditional random field model is configured to recognize each of the multiple convolution results to obtain the second prediction result at token-level of the target receipt, and the first conditional random field model and the second conditional random field model form a double-layer conditional random field model and are co-trained. Therefore, a segmentation error introduced by the first conditional random field model is avoided, and a prediction performance of the first conditional random field model is promoted while a performance of the second conditional random field model is improved.

In this embodiment, the second prediction result may be at token-level or node-level.

In this embodiment, the text block-level may be the node-level.

In the related art, only the second conditional random field model is configured to recognize, but in this way, the segmentation error will be additionally introduced. In the present disclosure, the first conditional random field model and the second conditional random field model complement each other to jointly improve a recognition performance of the whole system, and the convolution results are recognized by the first conditional random field model, so as to improve the prediction accuracy at token-level.

Through the above steps S102 to S108, the target receipt to be recognized is acquired, wherein the target receipt may include multiple text blocks; the two-dimensional position information of the multiple text blocks on the target receipt is encoded respectively, to obtain the multiple encoding results; the graph convolution is performed on the multiple code results respectively, to obtain the multiple convolution results, wherein the multiple convolution results are corresponding to the multiple encoding results in a one-to-one manner; and each of the multiple convolution results is recognized based on the first conditional random field model and the second conditional random field model to obtain a first prediction result at text block-level and a second prediction result at token-level of the target receipt. The first conditional random field model and the second conditional random field model are configured to form the double-layer conditional random field model and are co-trained. Therefore, the segmentation error introduced by the first conditional random field model is avoided, a prediction performance of the second conditional random field model is promoted while a performance of the first conditional random field model is improved, and further a technical problem of low efficiency of recognizing a receipt is solved, and a technical effect of improving the efficiency of recognizing a receipt is achieved.

The above method in this embodiment will be described in further detail below.

As an optional implementation, each of each of the encoding results may include a first hidden layer vector at token-level of a corresponding text block. The step that each of the multiple convolution results is recognized based on a first conditional random field model, to obtain a first prediction result may include: a sum of each of the multiple convolution results at token-level and a corresponding first hidden layer vector are transformed into a corresponding second hidden layer vector at token-level; a first text block vector of each of the multiple text blocks is determined based on the corresponding second hidden layer vector; and the first text block vector of each of the multiple text blocks is recognized based on the first conditional random field model, to obtain the first prediction result.

In this embodiment, the convolution result may be a hidden layer vector at token-level expanded, which is expressed as follows:

$$\text{Expand(node\_hidden}^{l+1})$$

The second hidden layer vector may be a final hidden layer at token-level token_final_hidden, and the text block (node) vector may be node_final_hidden.

In this embodiment, an output node_hidden$^{l+1}$ of the node graph convolution outputnode_hidden$^{l+1}$ is expanded to be at token-level, and then node_hidden$^{l+1}$ at token-level is added to the token-level hidden layer vector at token-level to be determined as an input of the BiLSTM network. Through the BiLSTM network, a final hidden layer representation at token-level token_final_hidden$\in R^{B \times N \times T \times D}$ is obtained, and the final hidden layer representation at token-level is sent to the token CRF network, to obtain a prediction resulttoken_crf_outputs$\in R^{B \times N \times T}$ at token-level. The final hidden layer representations at token-level token_final_hidden in the same one text block is summed, to obtain the corresponding text block vector representation, which may also be named as a word vector representation node_final_hidden$\in R^{B \times N \times D}$, and then the text block vector representation is sent to the node CRF network, to obtain the prediction result node_crf_outputs$\in R^{B \times N}$ at node-level, which is as the following expression:

biLstm_inputs=token_hidden+Expand(node$_{hidden}^{l+1}$);

token_final_hidden=BiLSTM(biLstm$_{inputs}$);

token_crf_outputs=TokenCRF(token$_{final_{hidden}}$).

According to this embodiment, the sum of each of the convolution results at token-level and a corresponding first hidden layer vector is transformed into the second hidden layer vector at token-level; then the first text block vector of each of the multiple text blocks is determined based on the corresponding second hidden layer vector; and finally, the first text block vector of each of the multiple text blocks is recognized based on the first conditional random field model, to obtain the first prediction result. In this way, an output result of the first conditional random field model (a conditional random field model at node-level) may be determined as a final prediction result, so as to avoid introducing an additional difference error.

As an optional implementation, the method further may include: the second hidden layer vector is recognized based on the second conditional random field model, to obtain the second prediction result.

In this embodiment, the second conditional random field model may be configured to recognize each of the multiple convolution results, so as to obtain the second prediction result at token-level of the target receipt.

In this embodiment, the second hidden layer vector may be recognized based on the second conditional random field model, to obtain the second prediction result. For example, final hidden layer representations at token-level token_final_hidden in the same one text block are summed to obtain a corresponding text block vector representation, which may also be named as a word vector representation node_final_hidden$\in R^{B \times N \times D}$, and then the text block vector representation is sent to the node CRF network, to obtain a prediction result at node-level node_crf_outputs$\in R^{B \times N}$.

According to this embodiment, the second hidden layer vector is recognized by the second conditional random field (a conditional random field model at token-level), to obtain the second prediction result. In this way, each of the multiple convolution results may be recognized by the conditional random field model at token-level, to obtain the prediction result at token-level. Therefore, accuracy of single character prediction of a text block is improved.

As an optional implementation, the method further may include: the first conditional random field model is obtained by training based on a first loss function of the first conditional random field model and a second loss function of the second conditional random field model.

In this embodiment, the first conditional random field model may be obtained by training based on the first loss function of the first conditional random field model and the second loss function of the second conditional random field model. For example, the losses of the two networks are added to learn together, and correct classification at token-level may improve accuracy at node-level, and the segmentation error additionally introduced by a conventional token CRF network may be avoided. The first loss function may be expressed as follows:

loss$_{node\_crf}$=−log P$_{node}$(node_tags|node_final_hidden).

The second loss function may be expressed as follows:

loss$_{token\_crf}$=−log P$_{token}$(token_tags|token_final_hidden).

In this embodiment, the first conditional random field model is obtained by training based on the first loss function of the first conditional random field model and the second loss function of the second conditional random field model. In this way, the first model (a conditional random field model at node-level) may be trained based on the losses of the two models, so as to acquire an effect that training the first conditional random field model.

As an optional implementation, the step that the first conditional random field model is obtained by training based on a first loss function of the first conditional random field model and a second loss function of the second conditional random field model may include: a sum of the first loss function and the second loss function of the second conditional random field model is obtained; and the first conditional random field model is obtained by training based on the sum.

In this embodiment, the first loss function may be expressed as follows:

loss$_{node\_crf}$=−log P$_{node}$(node_tags|node_final_hidden)

The second loss function may be expressed as follows:

loss$_{token\_crf}$=log P$_{token}$(token_tags|token_final_hidden)

In this embodiment, the sum of the first loss function and the second loss function of the second conditional random field model is obtained. For example, the sum is obtained by adding the first loss function and the second loss function, and the first conditional random field model is obtained by training based on the sum.

In this embodiment, the sum of the first loss function and the second loss function of the second conditional random field model is obtained, and then the first conditional random field model is obtained by training based on the sum. In this way, the first conditional random field model may be trained based on the loss sum of the two models, so as to improve a prediction performance of the first conditional random field model.

As an optional implementation, the two-dimensional position information may include a two-dimensional coordinate of each of the multiple text blocks on the target receipt, wherein the step S104 that the two-dimensional position information of the multiple text blocks on the target receipt is encoded respectively, to obtain the multiple encoding results may include: a target coordinate vector corresponding to the two-dimensional coordinate of each of the multiple text blocks is determined; and the target coordinate vector is encoded, to obtain each of the multiple encoding results.

In this embodiment, the target coordinate vector corresponding to the two-dimensional coordinate is determined. For example, the two-dimensional coordinate information of each of the multiple text blocks may be $\{x_0,y_0,x_1,y_1\}$, wherein $(x_0,y_0)$ and $(x_1,y_1)$ are coordinate of an upper left corner and a coordinate of a lower right corner of the text box respectively. A coordinate vector corresponding to the upper left corner and a coordinate vector corresponding to the lower right corner are summed to obtain a two-dimensional coordinate vector bbox_emb$\in R^{B \times N \times D}$ of each of the multiple text blocks. An abscissa X is initialized to obtain a corresponding coordinate vector table, an ordinate Y is initialized to obtain a corresponding coordinate vector table, and an vector representation corresponding to the coordinates is obtained by looking up the coordinate vector table, which is as follows:

bbox_emb=$x_0$_emb+$y_0$_emb+$x_1$_emb+$y_1$_emb $x_i$_emb=XPositionEmbLookUp($x_i$)

$y_i$_emb=YPositionEmbLookUp($y_i$)

In this embodiment, the target coordinate vector is encoded to obtain each of the multiple encoding results. For example, $R^{B \times N \times D}$ is expanded into $R^{B \times N \times T \times D}$ by expanding image_emb and bbox_emb, and finally, the above three expanded vectors (emd) are added together to input a transformer model, to obtain a hidden layer output at token-level token_hidden$\in R^{B \times N \times T \times D}$.

In this embodiment, the target coordinate vector corresponding to the two-dimensional coordinates of each of the multiple text blocks is determined, and then the target coordinate vector is encoded to obtain each of the multiple encoding results. In this way, at least one two-dimensional coordinate bbox feature of the text block may be introduced when at least one text block feature of the target receipt is computed, and the at least one bbox feature expanded is combined with a token-level vector of each of the multiple text blocks, so as to enhance sensitivity of the graph convolutional network to coordinate information.

As an optional implementation, the two-dimensional coordinates include a first two-dimensional coordinate of a first corner and a second two-dimensional coordinate of a second corner of a text box of each of the multiple text blocks, and the first corner and the second corner are located on a diagonal line of the text box, wherein the step that a target coordinate vector corresponding to the two-dimensional coordinates of each of the multiple text blocks is determined may include: a first coordinate vector corresponding to the first two-dimensional coordinate and a second coordinate vector corresponding to the second two-dimensional coordinate are determined; and a sum of the first coordinate vector and the second coordinate vector is determined as the target coordinate vector.

In this embodiment, the first two-dimensional coordinate of the first corner may be the coordinate $(x_0,y_0)$ of the lower left corner, the second two-dimensional coordinate of the second corner may be the coordinate $(x_1,y_1)$ of the lower right corner, the first two-dimensional coordinate may be $\{x_0,y_0,x_1,y_1\}$, wherein $(x_0,y_0)$ and $(x_1,y_1)$ are the coordinate of the upper left corner and the coordinate of the lower right corner of the text box respectively, and the target coordinate vector may be a bounding box vector (bbox_emb) of the text block.

In this embodiment, the sum of the first coordinate vector and the second coordinate vector is determined as the target coordinate vector. For example, the coordinate vector corresponding to the upper left corner and the coordinate vector corresponding to the lower right corner are summed, to obtain the two-dimensional coordinate vector bbox_emb$\in R^{B \times N \times D}$ of each of the multiple text blocks. For example, bbox_emb=$x_0$_emb+$y_0$_emb+$x_1$_emb+$y_1$_emb.

In this embodiment, the first coordinate vector corresponding to the first two-dimensional coordinate and the second coordinate vector corresponding to the second two-dimensional coordinate are determined, and then the sum of the first coordinate vector and the second coordinate vector is determined as the target coordinate vector. In this way, the two-dimensional coordinate vector of each of the multiple text blocks of the target receipt may be obtained, so as to introduce the at least one two-dimensional coordinate bbox feature of the text block.

As an optional implementation, the method further may include: an vector dimension of the target coordinate vector is adjusted from an original vector dimension to a target vector dimension based on size information of each of the multiple text blocks, wherein the target vector dimension is greater than the original vector dimension. The step that the target coordinate vector is encoded, to obtain each of the multiple encoding results may include: the target coordinate vector of the target vector dimension is encoded, to obtain each of the multiple encoding results.

In this embodiment, the size information may be max_size (T) of each of the multiple text blocks, the original vector dimension may be represented as $R^{B \times N \times D}$, and the target coordinate vector may be represented as $R^{B \times N \times T \times D}$, B represents batch_size, N represents that one image has at most N text blocks, T represents max_size of each of the multiple text blocks, that is to say, each of the multiple text blocks has at most T characters, and D represents a word vector dimension (vector dimension).

In this embodiment, the vector dimension of the target coordinate vector may be adjusted from the original vector dimension to the target vector dimension based on the size information of each of the multiple text blocks. For example, the multiple text blocks (text_segments e $R^{B \times N \times T}$) on the target receipt are transformed into an vector representation at token-level (text_emb$\in R^{B \times N \times T \times D}$) by looking up in a word vector table.

In this embodiment, the target coordinate vector of the target vector dimension may be encoded, to obtain each of the multiple encoding results. For example, the target coordinate vector may be Expand(bbox_emb), the obtained text_emb is at token-level, image_emb and bbox_emb is at text block granularity (node granularity). $R^{B \times N \times D}$ is expanded into $R^{B \times N \times T \times D}$ by expanding image_emb and bbox_emb. And finally, the above three expanded vectors (emds) are added together to input a transformer model, to obtain the hidden layer output at token-level token_hidden$\in R^{B \times N \times T \times D}$ which is expressed as follows:

transformer_input_x=text_emb+Expand(image_emb)+Expand(bbox_emb)

token_hidden=Transformer(transformer$_{input\_x}$)

In this embodiment, the vector dimension of the target coordinate vector is adjusted from the original vector dimension to the target vector dimension based on the size information of each of the multiple text blocks, and then the target coordinate vector of the target vector dimension is encoded, to obtain each of the multiple encoding results. In this way, the input of the model may be transformed into an vector representation at token-level by looking up the word vector table, and then the vector representation at token-level is encoded by an encoder, to achieve an effect that a coordinate vector corresponding to the text block on the target receipt is encoded.

As an optional implementation, the method further may include: each of the multiple text blocks is transformed into a token-level vector. The step that the target coordinate vector of the target vector dimension is encoded, to obtain each of the multiple encoding results may include: the token-level vector and the target coordinate vector of the target vector dimension are encoded, to obtain each of the multiple encoding results.

In this embodiment, each of the multiple text blocks may be transformed into a token-level vector. For example, the token-level vector may be expressed as text_emb, and each of the multiple text blocks may be transformed into an vector expressed as text_emb.

In this embodiment, the token-level vector and the target coordinate vector of the target vector dimension are encoded, to obtain each of the multiple encoding results, which is configured to, for example, enhance sensitivity of a downstream graph convolutional network and a double-layer CRF network for coordinate information.

According to this embodiment, each of the multiple text blocks is transformed into the token-level vector, and the token-level vector and the target coordinate vector of the target vector dimension are encoded. In this way, the token-level vector and the target coordinate vector may be input to the encoder to be encoded, to obtain the encoding result (hidden layer output at token-level), so as to achieve an effect that at least one bounding box feature of the text block expanded is combined with the token-level vector.

As an optional implementation, the method further may include: a sub-image corresponding to each of the multiple text blocks is encoded, to obtain a sub-image vector of each of the multiple text blocks; an vector dimension of the sub-image vector is adjusted from an original vector dimension to a target vector dimension; wherein the step that the token-level vector and the target coordinate vector of the target vector dimension are encoded, to obtain each of the multiple encoding results may include: the sub-image vector of the target vector dimension, the token-level vector and the target coordinate vector of the target vector dimension are encoded, to obtain each of the multiple encoding results.

In this embodiment, the sub-image corresponding to each of the multiple text blocks may be encoded, to obtain the sub-image vector of each of the multiple text blocks. For example, the sub-image vector may be represented as image_emb, the sub-image corresponding to each of the multiple text blocks of the target receipt may be represented as image_segment, then the sub-image image_segments$\in R^{B \times N}$ corresponding to a current input batch is encoded by a convolutional neural network (CNN) to obtain vector representation image_emb$\in R^{B \times N \times D}$ of the sub-image, which is as follows:

image_emb=CNN(image_segments

In this embodiment, the sub-image vector of the target vector dimension, the token-level vector and the target coordinate vector of the target vector dimension are encoded, to obtain each of the multiple encoding results. For example, after obtained text_emb is tokenization, image_emb and bbox_emb is at text block granularity (node granularity), $R^{B \times N \times D}$ is expanded into $R^{B \times N \times T \times D}$ by expanding image_emb and bbox_emb, and finally, a result of computing the above three expanded vectors (emds) is determined as an input of a transformer model, to obtain the hidden layer output at token-level token_hidden$\in R^{B \times N \times T \times D}$.

According to this embodiment, the sub-image corresponding to each of the multiple text blocks is encoded, to obtain the sub-image vector of each of the multiple text blocks, then the vector dimension of the sub-image vector is adjusted from the original vector dimension to the target vector dimension, and then the sub-image vector of the target vector dimension, the token-level vector and the target coordinate vector of the target vector dimension are encoded. In this way, the sub-image vector, the token-level vector and the target coordinate vector may be input to the encoder to be encoded, to obtain the encoding result (a hidden layer output at token-level), so as to achieve an effect that at least one bounding box (bbox) feature of the text block expanded is combined with the token-level vector.

As an optional implementation, each of each of the encoding results may include a first hidden layer vector at token-level of a corresponding text block, wherein the step that the sub-image vector of the target vector dimension, the token-level vector and the target coordinate vector of the target vector dimension are encoded, to obtain each of the multiple encoding results may include: a sum of the sub-image vector of the target vector dimension, the token-level vector, and the target coordinate vector of the target vector dimension are transformed into the first hidden layer vector at token-level of the corresponding text block of each of the multiple text blocks.

In this embodiment, the sum of the sub-image vector of the target vector dimension, the token-level vector, and the target coordinate vector of the target vector dimension are transformed into the first hidden layer vector at token-level of the corresponding text block. For example, $R^{B \times N \times D}$ is expanded into $R^{B \times N \times T \times D}$ by expanding image_emb and bbox_emb, and finally, a result of summing the above three expanded vectors (emds) is determined as an input of a transformer model, to obtain the hidden layer output at token-level token_hidden E $R^{B \times N \times T \times D}$.

In this embodiment, the node level may be the node level, the first prediction result may be represented as node_crf_outputs, the first conditional random field model may be a CRF network at node-level (node CRF) in a double-layer CRF. Each of the multiple convolution results is recognized based on the first conditional random field model, to obtain the first prediction result. For example, the first conditional random field model may be a double-layer CRF structure, which is composed of a CRF network (token CRF) at token-level and a CRF network (node CRF) at node-level, and learning of token_crf_outputs is configured to assist leaning of node_crf.

In this embodiment, the second conditional random field model may be a CRF network at token-level (token CRF), and the second prediction result at token-level may be represented as token_crf_outputs.

In this embodiment, the sum of the sub-image vector of the target vector dimension, the token-level vector and the target coordinate vector of the target vector dimension is transformed into the first hidden layer vector at token-level of the corresponding text block. In this way, the at least one bbox feature of the text block expanded is combined with the token-level vector, so as to achieve an effect that the sensitivity of the graph convolutional network for coordinate information is enhanced.

As an optional implementation, each of the encoding results may include a first hidden layer vector at token-level of a corresponding text block, wherein the step S106 that the graph convolution is performed on the multiple encoding results respectively, to obtain multiple convolution results may include: a second text block vector of each of the multiple text blocks is determined based on a corresponding first hidden layer vector; and the graph convolution is performed on the second text block vector of each of the multiple text blocks, to obtain each of the multiple convolution results.

In this embodiment, the second text block vector may be a hidden layer vector at node-level (node_hidden).

In this embodiment, the graph convolution may be performed on the second text block vector of each of the multiple text blocks, to obtain each of the multiple convolution results. For example, hidden layer representations of words in a bbox of the same one text block are added together, to obtain an vector representation node_hidden$\in R^{B \times N \times D}$ of the text block. An vector representation of a node is subjected to multi-layer graph convolution, to obtain final node graph convolution output node_hidden$^{l+1} \in R^{B \times N \times D}$.

In this embodiment, the second text block vector of each of the multiple text blocks is determined based on the corresponding first hidden layer vector, and then the graph convolution is performed on the second text block vector of each of the multiple text blocks, to obtain each of the multiple convolution results, so as to enhance a relation between nodes, and a performance of the graph convolution is improved.

In an embodiment of the present disclosure, the at least one two-dimensional coordinate bbox feature of the text block is introduced during initial feature computation, and the at least one bbox feature expanded is combined with the token-level vector (text vector) for enhancing sensitivity of a downstream graph convolutional network for coordinate information. Furthermore, the node CRF network is proposed, and the node CRF and the token CRF are simultaneously used to form the double-layer CRF network, such that the segmentation error additionally introduced by a traditional token CRF network is avoided. Moreover, by using the double-layer network, a prediction performance at node-level is promoted while prediction accuracy at token-level is improved, the technical problem of low efficiency of recognizing a receipt is solved, and the efficiency of recognizing a receipt is improved.

The method for recognizing a receipt of the present disclosure is further described in combination with preferential embodiments.

Figure 2:
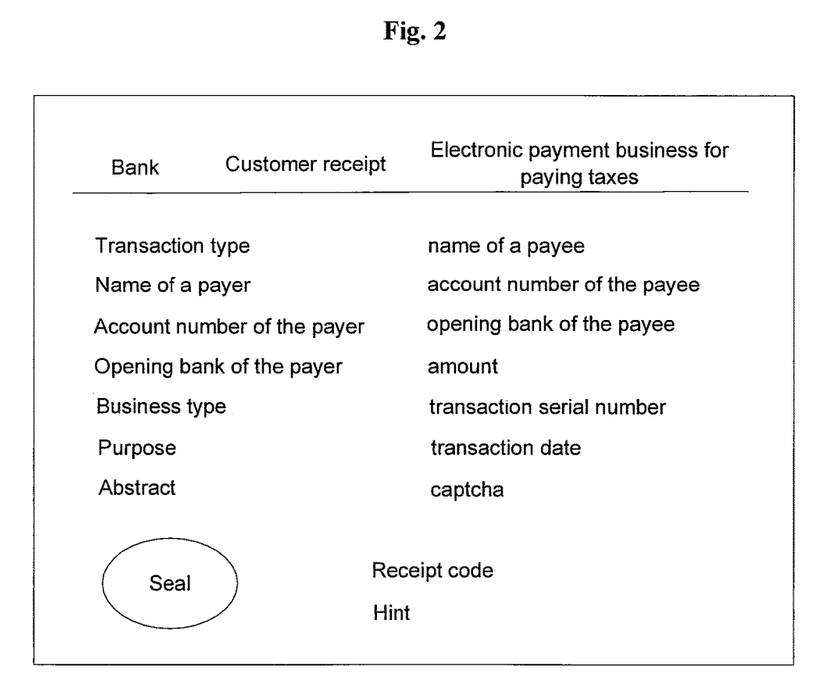
FIG. 2 is a schematic diagram of a bank deposit receipt according to an embodiment of the present disclosure.

FIG. 2 is a schematic diagram of a bank deposit receipt according to an embodiment of the present disclosure. As shown in FIG. 2, a task for recognizing a bank receipt requires inputting a single bank receipt picture put straight and an optical character recognition (OCR) result (including a content and coordinates of each single character, and contents and coordinates of each of the multiple of text blocks), and a structured result including specific fields is output. Key fields to be extracted for this task include: a name of a payer, an account number of the payer, an opening bank of the payer, business type, purpose, abstract, a name of a payee, an account number of the payee, an opening bank of the payee, amount, transaction serial number, transaction date, title, business type, purpose, abstract, captcha and so on.

In the related art, there are three methods for recognizing a bank receipt, which are respectively as follows:

First, for manual entry.

For different types of bank receipts of each of banks, a certain number of entry staffs are usually trained, so as to reduce human errors in extracting structured information from receipts.

Second, for a solution based on natural language processing.

In this solution, a structured task of document optical character recognition (OCR) is transformed into a task for "ocr+named entity recognition". A receipt is sent into an ocr model to obtain a content and coordinate information of each of characters on the receipt. In this way, a problem for receipt recognition structured may be transformed into a problem for named entity recognition in natural language processing. This solution is further divided into a method based on at least one rule and a method based on sequence tagging.

The method based on at least one rule uses rules manually summarized. For example, when a content corresponding to a number of an identity card is required to be found, a keyword "identity card" is found first, and then lateral search and longitudinal search are performed based on this keyword. When there is no corresponding keyword in a recognition target, a regular expression may be used to directly match the content, for a recognition content with a relatively fixed format, such as "date".

The method based on sequence tagging does not require rules manually summarized, and a sequence tagging model is directly used to find at least one target entity. According to this solution, an ocr recognition result is usually sent to the sequence tagging model by taking a character as a unit. Each of the characters is predicted by the sequence tagging model, and then prediction result of each of the characters is spliced and combined, to obtain the final structured result.

Third, for a solution based on image processing.

In this solution, a receipt structured task is transformed into an "object detection+ocr" task. A text detection box corresponding to a target field is obtained, then small pictures are cut according to the text detection box, and the small pictures are sent to the ocr model to obtain a final result.

According to different target detection solutions, the solution may be further include: a method based on a template and a method based on a target detection model. For the method based on a template, an input receipt is subjected to compute image similarity first to find a picture most similar to the input receipt in a template library, and a text detection box on the similar picture is taken as a detection result of the text box on the current picture. For the method based on the target detection model, a batch of data is usually labeled first, the data is used to train the target detection model, such as a cascade cycle convolutional neural network (Cascade-R-CNN), and a text box recognition result is directly obtained based on the detection model.

The disadvantages of the related art are as follows.

First, For manual entry.

The manual entry is strenuous, boring, time-consuming and labor-consuming.

Second, For a solution based on a natural language processing.

According to the method based on rules, keyword tables are required to be collected. For different templates, various search rules are required to be formulated, and multiple regular expressions are required to be compiled, which has the problems of complicated manual compilation, difficult maintenance, etc.

Figure 3:
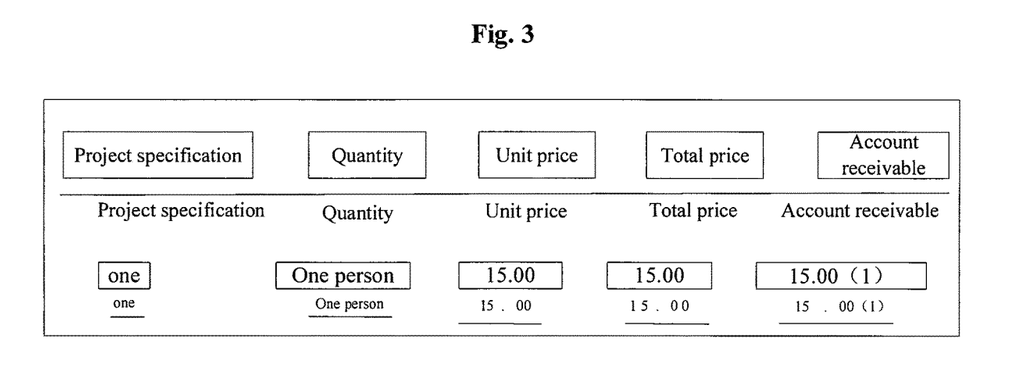
FIG. 3 is a schematic diagram of a processing effect of a solution based on natural language processing according to an embodiment of the present disclosure.

FIG. 3 is a schematic diagram of a processing effect of a solution based on natural language processing according to an embodiment of the present disclosure. As shown in FIG. 3, the method based on token-level sequence labeling may additionally introduce the segmentation error. For example, in a recognition scenario of medical receipt, for recognition of a number, a correct recognition result of the field "one person" should be recognized as {"number": "one person"}. However, "one" will be predicted as a numeric entity, "person" will be predicted as a unit entity with a sequence labeling model. This results in the segmentation error, and the recognition result is changed into {"number": "one", "unit": "person"}.

In order to solve the above problem about the segmentation, there is also related research that takes a phrase as a unit and put the phrase into the sequence labeling model recently. This solution has relatively poor performance in a long text scenario. Taking a bank receipt scenario as an example, a keyword is usually at a short sentence level, for example, a keyword "opening bank of a payer".

Third, for a solution based on image processing.

The solution based on image processing may integrate at least one image features such as a character size and character type, but may not understand semantic information of text.

For fields having the same character size, character type and location information, and distinguished by text contents, a limited processing capacity for this solution. Furthermore, according to the method based on the template, a template is required to be selected for each of the receipts, and selection of the template requires a certain strategy.

Figure 4:
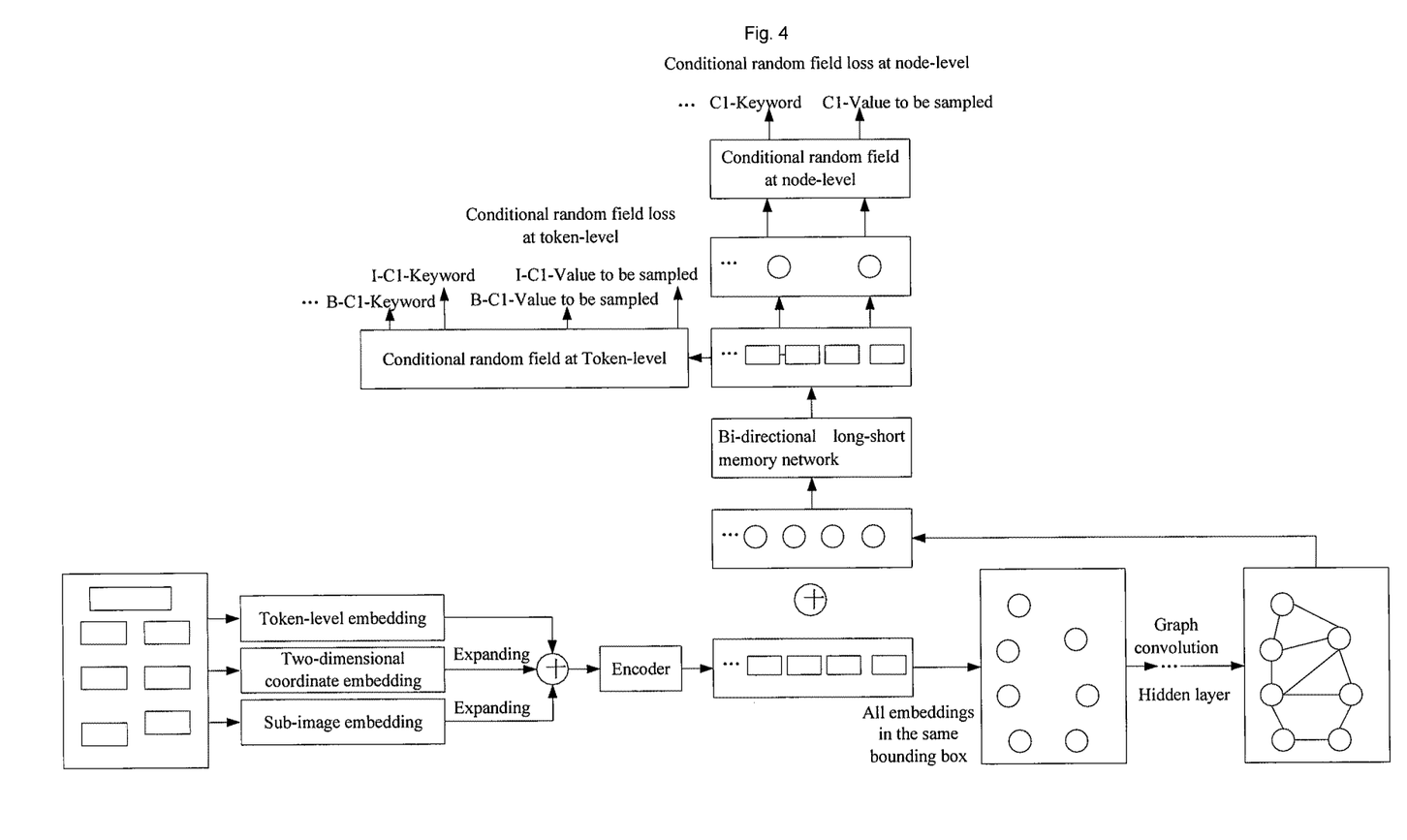
FIG. 4 is a schematic diagram of a method for recognizing a bank receipt based on double layers of conditional random field model and a graph convolutional network according to an embodiment of the present disclosure.

FIG. 4 is a schematic diagram of a method for recognizing a bank receipt based on double layers of conditional random model and a graph convolutional network according to an embodiment of the present disclosure. As shown in FIG. 4, the whole network is divided into three modules, which are including: encoder, graph convolution, and double layers of CRF respectively.

First, for Encoder.

A bank receipt picture D is given, which contains multiple text blocks $\{s_1, s_2, \ldots, s_n\}$, wherein each of the multiple text blocks $s_{index}$ is composed of multiple characters $\{c_1, c_2, \ldots, c_t\}$. An Input of a model is text_segments$\in R^{B \times N \times T}$, B represents batch$_{size}$, N represents that one picture has at most N text blocks, and T represents max_size of each of the multiple text blocks, that is to say, each of the multiple text blocks has at most T words. By looking up in a word vector table, text_segments is transformed into an vector representation at token-level text_emb$\in R^{B \times N \times T \times D}$ and D represents a word vector dimension (vector dimension), which is as follows:

text_emb=WordEmbLookUp(text$_{segments}$)

A sub-image corresponding to each of the multiple text blocks is represented as image_segment, then the sub-image image_segments$\in R^{B \times N}$ corresponding to a current input batch is encoded by the convolutional neural network (CNN), to obtain an vector representation image_emb$\in R^{B \times N \times D}$ of the sub-image, which is as follows:

image_emb=CNN(image_segments

Two-dimensional coordinate information of each of the multiple text blocks is $\{x_0, y_0, x_1, y_1\}$, wherein $(x_0, y_0)$ and $(x_1, y_1)$ are coordinates of an upper left corner and coordinates of a lower right corner of the text box respectively. A two-dimensional coordinate vectorbbox_emb$\in R^{B \times N \times D}$ is obtained by summing a coordinate vector corresponding to the upper left corner and a coordinate vector of the lower right corner. The abscissa X is initialized to obtain a corresponding coordinate vector table, the abscissa Y is initialized to obtain a corresponding coordinate vector table, and an vector representation corresponding to the coordinates is obtained by looking up the coordinate vector table.

bbox_emb=$x_0$_emb+$y_0$_emb+$x_1$_emb+$y_1$_emb $x_i$_emb=XPositionEmbLookUp($x_i$)

$y_i$_emb=YPositionEmbLookUp($y_i$)

In this way, obtained text_emb is at token-level, image_emb and bbox_emb is at text block granularity (node granularity). Therefore, $R^{B \times N \times D}$ is expanded into $R^{B \times N \times T \times D}$ by expanding image_emb and bbox_emb. The above three vectors (embs) are added together to be determined as input of a transformer model, to obtain a hidden layer output token_hidden E $R^{B \times N \times T \times D}$ at token-level, which is as follows:

transformer_input_x=text_emb+Expand(image_emb)+Expand(bbox_emb)

token_hidden=Transformer(transformer$_{input\_x}$)

Second, for graph convolution

Essence of convolution is F(WX+b), wherein X is represented as an input vector, F is represented as an activation function, W is represented as weight of a convolution kernel, and b is represented as a bias term. Core idea of the graph convolution is F(AXW), wherein A is represented as an adjacent matrix of a graph and is configured to represent weight of edges between nodes, that is to say, a connection relation between the nodes. When X*=AX, then the graph convolution may be understood as that each of the nodes collects information transmitted from at least one neighbor-node, and then updates each of the nodes after summarizing the information.

In a recognition scenario of the bank receipt, a keyword of the same class has an obvious horizontal connection relation with the corresponding value to be extracted, and the keywords of different classes also have an up-down connection relation with the values to be extracted of different classes. One text block is considered as one node, and after the vector representation of each of the nodes through the graph convolutional network, a relation between the nodes may be strengthened.

After a bank receipt being input into a model and passing through the encoder, a hidden layer output at token-level token_hidden$\in R^{B \times N \times T \times D}$ is obtained. Hidden layer representations of words of a bbox of the same one text block are added together, to obtain an vector representation node_hidden$\in R^{B \times N \times D}$ of the text block. an vector representation of each of the nodes is subjected to multi-layer graph convolution, to obtain final node graph convolution output node_hidden$^{l+1} \in R^{B \times N \times D}$, which is as follows:

node_hidden=Sum(token_hidden,dim=2)

node_hidden$^{l+1}$=Sigmoid($A \times$node_hidden$^l \times W^{l+1}$)

An adjacent matrix A and a convolution kernel W of a graph are randomly initialized. Graph convolution learning may use a self-supervised loss function. $v_i$ and $v_j$ node_hidden$^{l+1}$ are taken to represent an vector representation of an i node and an vector representation of a j node respectively, and then the loss function is as follows:

$$loss_{graphconv} = \sum_{i,j=1}^{N} \exp(A_{ij} + \eta\|U_i - U_j\|_2^2) + \gamma\|A\|_F^2$$

$$\sum_{j=1}^{N} A_{ij} = 1, A_{ij} \geq 0$$

γ is a hyperparameter, and may be set in advance, for example, be set as 0.1.

A meaning of the loss function is as follows: when a distance between two nodes is relatively large, then relation weight $A_{ij}$ between the two nodes will be relatively small.

Third, for double-layer CRF

At a prediction end of a model, a structure of the double-layer CRF, which is composed of a token-level CRF network (token CRF) and a CRF network at node-level (node CRF). The Token CRF is helpful to improve prediction accuracy of a single character in a text block. An output result of the node CRF is taken as a final prediction result, thereby the segmentation error additionally introduced in the token CRF prediction result is avoided. The two networks complement each other to improve a recognition performance of the whole system.

The output of the node graph convolution node_hidden$^{l+1}$ is expanded to be in token-level at token-level, and then node_hidden$^{l+1}$ in token-level at token-level is added to the hidden layer vector in token-level at token-level to input a BiLSTM network. node_hidden$^{l+1}$ in token-level at token-level passes through the BiLSTM network to obtain a final hidden layer representation in token-level at token-level token_final_hidden∈$R^{B \times N \times T \times D}$, the final hidden layer representation in token-level at token-level is sent to the token CRF network, to obtain a prediction result in token-level at token-level token_crf_outputs∈$R^{B \times N \times T}$.

biLstm_inputs=token_hidden+Expand(node_hidden$^{l+1}$)

token_final_hidden=BiLSTM(biLstm_inputs)

token_crf_outputs=TokenCRF(token_final_hidden)

Then, the final hidden layer representations at token-level token_final_hidden in the same one text block is summed, to obtain a corresponding text block vector representation, which may also be named as a node vector, which is expressed as follows:

node_final_hidden∈$R^{B \times N \times D}$

Then, the text block vector representation is sent to the node CRF network, to obtain a prediction result at node-level node_crf_outputs∈$R^{B \times N}$.

For example, when a prediction result of a certain text block node is class1-value, then an extraction result corresponding to class 1 may be directly written as {class1: value}, which is as follows:

node_final_hidden=Sum(token_final_hidden,dim=2)

node_crf_outputs=NodeCRF(node_final_hidden)

The loss function of the node CRF and the loss function of the token CRF are computed as $loss_{node\_crf}$ and $loss_{token\_crf}$ respectively by maximum likelihood estimation, which is as follows:

$loss_{node\_crf}$=−log $P_{node}$(node_tags|node_final_hidden)

$loss_{token\_crf}$=−log $P_{token}$(token_tags|token_final_hidden)

token_tags is tagging at token-level, such as B-class1_key, I-class1_value, O, B-class2_key, I-class2_value, a total quantity is class_num*2*len(BI)+1. node_tags is tagging at node-level, such as class1_key, class1_value, class2_key, class2_value, and a total quantity is class_num*2. $P_{token}$(Y|X) and $P_{node}$(Y|X) are conditional probabilities corresponding to the token CRF and the node CRF respectively.

Joint loss function is:

The model uses joint loss of the node CRF, the token CRF and the graph convolutional network, which is defined as follows:

$$loss = \alpha loss_{loss_{node\_crf}} + \beta loss_{token\_crf} + \gamma loss_{graph\_conv}$$

α, β and γ are hyperparameters, and the sum of α, β and γ is 1.

In an embodiment of the present disclosure, the at least one two-dimensional coordinate bbox feature of the text block is introduced during initial feature computation, and the at least one bbox feature expanded is combined with the token-level vector (text vector) for enhancing sensitivity of a downstream graph convolutional network and the double-layer CRF network to coordinate information. Furthermore, the node CRF network is proposed, and the node CRF and the token CRF are simultaneously used to form the double-layer CRF network, such that the segmentation error additionally introduced by a traditional token CRF network is avoided. Moreover, by using the double-layer network, a node-level prediction performance is promoted while prediction accuracy at token-level is improved, the technical problem of low efficiency of recognizing a receipt is solved, and the efficiency of recognizing a receipt is improved.

An apparatus for recognizing a receipt for executing the method for recognizing a receipt in the embodiment shown in FIG. 1 is further provided in an embodiment of the present disclosure.

Figure 5:
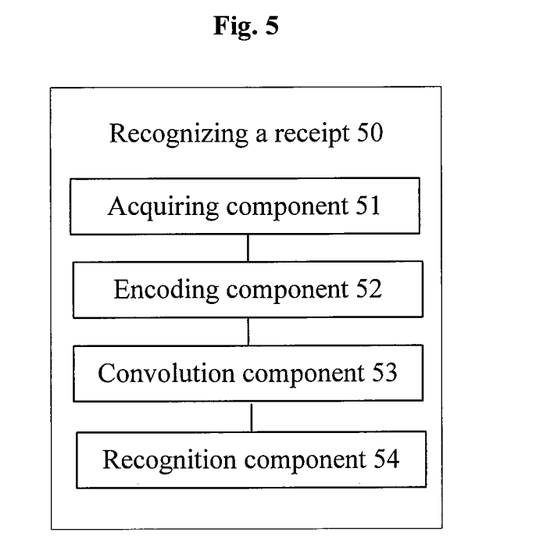
FIG. 5 is a schematic diagram of an apparatus for recognizing a receipt according to an embodiment of the present disclosure.

FIG. 5 is a schematic diagram of a apparatus for recognizing a receipt according to an embodiment of the present disclosure. As shown in FIG. 5, the apparatus for recognizing a receipt 50 may include: an acquiring component 51, an encoding component 52, a convolution component 53, and an recognition component 54.

The acquiring component 51 is configured to acquire a target receipt to be recognized, wherein the target receipt including multiple text blocks.

The encoding component 52 is configured to encode two-dimensional position information of the multiple text blocks on the target receipt to obtain multiple encoding results, the multiple encoding results corresponding to the multiple text blocks in a one-to-one manner.

The convolution component is configured to perform graph convolution on the multiple encoding results respectively, to obtain multiple convolution results, wherein the multiple convolution results are corresponding to the multiple encoding results in a one-to-one manner.

The recognition component 54 is configured to recognize each of the multiple convolution results is recognized based on a first conditional random field model to obtain a first prediction result at text block-level of the target receipt, wherein the first conditional random field model and a second conditional random field model are co-trained, and the second conditional random field model is configured to recognize each of the convolution results, so as to obtain a second prediction result at token-level of the target receipt.

Optionally, the first prediction result is configured to represent structured information corresponding to keywords of the target receipt.

Optionally, each of the encoding results may include a first hidden layer vector at token-level of a corresponding text block. The recognition component 54 may include a conversion component configured to transform a sum of each of multiple convolution results at token-level and a corresponding first hidden layer vector to a second hidden layer vector at token-level; a first determination component configured to determine a first text block vector of each of the multiple text blocks based on the corresponding second hidden layer vector; and a recognition component configured to recognize the first text block vector of each of the multiple text blocks based on the first conditional random field model, to obtain the first prediction result.

Optionally, the apparatus further may include: a first recognition component configured to recognize the second hidden layer vector based on the second conditional random field model, to obtain the second prediction result.

Optionally, the apparatus further may include: a training component configured to train based on a first loss function of the first conditional random field model and a second loss function of the second conditional random field model, to obtain the first conditional random field model.

Optionally, the training component may include: an acquiring component configured to obtain a sum of the first loss function and the second loss function of the second conditional random field model; and a training component configured to train based on the sum to obtain the first conditional random field model.

Optionally, the two-dimensional position information may include two-dimensional coordinates of each of the multiple text blocks on the target receipt. The encoding component 52 may include: a second determination component configured to determine a target coordinate vector corresponding to the two-dimensional coordinates of each of the multiple text blocks; and an encoding component configured to encode the target coordinate vector, to obtain each of the multiple encoding results.

Optionally, the two-dimensional coordinates include a first two-dimensional coordinate of a first corner and a second two-dimensional coordinate of a second corner of a text box of each of the multiple text blocks, and the first corner and the second corner are located on a diagonal line of the text box. The second determination module may include: a first determination sub-component configured to determine a first coordinate vector corresponding to the first two-dimensional coordinate and a second coordinate vector corresponding to the second two-dimensional coordinate; and a second determination sub-component configured to determine a sum of the first coordinate vector and the second coordinate vector as the target coordinate vector.

Optionally, the apparatus further may include: a first adjustment component configured to adjust an vector dimension of the target coordinate vector from an original vector dimension to a target vector dimension based on size information of each of the multiple text blocks, wherein the target vector dimension is greater than the original vector dimension. The encoding module may include an encoding sub-component configured to encode the target coordinate vector of the target vector dimension, to obtain each of the multiple encoding results.

Optionally, the apparatus further may include: a first transformation component configured to transform each of the multiple text blocks into a token-level vector. The encoding sub-module may include an encoding sub-component configured to encode the token-level vector and the target coordinate vector of the target vector dimension, to obtain each of the multiple encoding results.

Optionally, the apparatus further may include: a first encoding component configured to encode a sub-image corresponding to each of the multiple text blocks, to obtain a sub-image vector of each of the multiple text blocks. The a first second adjustment component configured to adjust an vector dimension of the sub-image vector from an original vector dimension to a target vector dimension. The encoding sub-component is further configured to encode the token-level vector and the target coordinate vector of the target vector dimension, to obtain each of the multiple encoding results by means of the following steps: encode the sub-image vector of the target vector dimension, the token-level vector and the target coordinate vector of the target vector dimension are encoded to obtain each of the multiple encoding results.

Optionally, each of each of the encoding results may include a first hidden layer vector at token-level of a corresponding text block. The encoding sub-component is further configured to transform a sum of the sub-image vector of the target vector dimension, the token-level vector, and the target coordinate vector of the target vector dimension into the first hidden layer vector at token-level of the corresponding text block.

Optionally, each of each of the encoding results may include a first hidden layer vector at token-level of a corresponding text block. The convolution component 53 may include: a third determination component configured to determine a second text block vector of each of the multiple text blocks based on the corresponding first hidden layer vector; and a convolution component configured to perform the graph convolution on the second text block vector of each of the multiple text blocks, to obtain each of the multiple convolution results.

In an embodiment of the present disclosure, at least one bounding box (bbox) features of the two-dimensional coordinate of the text block are introduced during initial feature computation, the at least one bbox feature expanded is combined with the token-level vector (text vector) for enhancing sensitivity of a downstream graph convolutional network and the double-layer CRF network for coordinate information. The node CRF network is proposed, and the node CRF and the token CRF are simultaneously used to form the double-layer CRF network, such that the segmentation error additionally introduced by a traditional token CRF network is avoided. Moreover, by using the double-layer CRF network, a prediction performance at node-level is promoted while prediction accuracy at token-level is improved, the technical problem of low efficiency of recognizing a receipt is solved, and the efficiency of recognizing a receipt is improved.

In the technical solutions of the present disclosure, acquisition, storage, application, and the like of the user's personal information involved arell in compliance with the provisions of relevant laws and regulations, and do not violate public order and good customs.

According to an embodiment of the present disclosure, an electronic device, a readable storage medium and a computer program product are further provided in the present disclosure.

An electronic device is further provided in an embodiment of the present disclosure. The electronic device may include: at least one processor; and a memory in communication connection with the at least one processor, wherein the memory stores at least one instruction that is able to be executed by the at least one processor, and the at least one instruction is executed by the at least one processor, so as to enable the at least one processor to perform the method for recognizing a receipt in an embodiment of the present disclosure.

Optionally, the above-mentioned electronic device may further include a transmission device and an input/output device. The transmission device is connected to the above-mentioned processor, and the input/output device is connected to the above processor.

Optionally, in the embodiment, a non-transitory computer-readable storage medium may be configured to store a computer program for executing the following steps:

step S1, a target receipt to be recognized is acquired, wherein the target receipt includes multiple text blocks;

step S2, two-dimensional position information of the multiple text blocks on the target receipt is encoded respectively, to obtain multiple encoding results, wherein the multiple encoding results are corresponding to the multiple text blocks in a one-to-one manner;

step S3, graph convolution is performed on the multiple encoding results respectively, to obtain multiple convolution results, wherein the multiple convolution results are corresponding to the multiple encoding results in a one-to-one manner; and step S4, each of the multiple convolution results is recognized based on a first conditional random field model, to obtain a first prediction result at text block-level of the target receipt, wherein the first conditional random field model and a second conditional random field model are co-trained, and the second conditional random field model is configured to recognize each of the multiple convolution results, so as to obtain a second prediction result at token-level of the target receipt. Optionally, the first prediction result is configured to represent structured information corresponding to keywords of the target receipt.

Optionally, in the embodiment, the above-mentioned non-transitory computer-readable storage medium may include, but is not limited to, electronic, magnetic, optical, electromagnetic, infrared or semiconductor systems, apparatuses or devices, or any suitable combination of the foregoing. More specific examples of the readable storage medium may include an electrical connection based on at least one wire, a portable computer disk, a hard disk, a random-access memory (RAM), a read-only memory (ROM), an erasable programmable read-only memory (EPROM or a flash memory), an optical fiber, a compact disk read-only memory (CD-ROM), an optical storage device, a magnetic storage device or any suitable combination of the foregoing.

According to an embodiment of the present disclosure, a computer program product including a computer program is further provided in the present disclosure. The computer program is executed by a processor to perform the following steps:

step S1, a target receipt to be recognized is acquired, wherein the target receipt includes multiple text blocks;

step S2, two-dimensional position information of the multiple text blocks on the target receipt is encoded respectively, to obtain multiple encoding results, wherein the multiple encoding results are corresponding to the multiple text blocks in a one-to-one manner;

step S3, graph convolution is performed on the multiple encoding results respectively, to obtain multiple convolution results, wherein the multiple convolution results are corresponding to the multiple encoding results in a one-to-one manner; and step S4, each of the multiple convolution results is recognized based on a first conditional random field model, to obtain a first prediction result at text block-level of the target receipt, wherein the first conditional random field model and a second conditional random field model are co-trained, and the second conditional random field model is configured to recognize each of the multiple convolution results, so as to obtain a second prediction result at token-level of the target receipt. Optionally, the first prediction result is configured to represent structured information corresponding to keywords of the target receipt.

Figure 6:
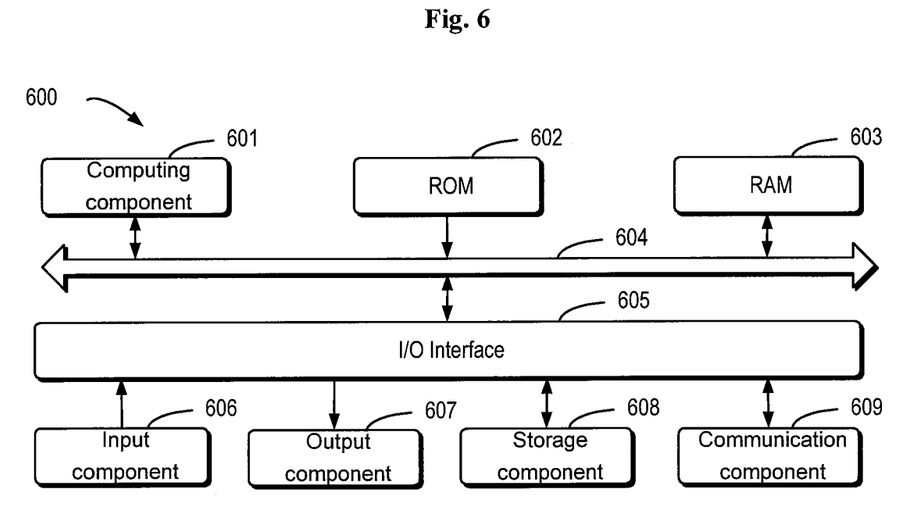
FIG. 6 is a schematic block diagram of an electronic device according to an embodiment of the present disclosure.

FIG. 6 is a schematic block diagram of an electronic device according to an embodiment of the present disclosure. The electronic device is intended to represent various forms of digital computers, such as laptop computers, desktop computers, workstations, personal digital assistants, servers, blade servers, mainframe computers and other suitable computers. The electronic device may also represent various forms of mobile apparatuses, such as personal digital processors, cellular telephones, smart phones, wearable apparatuses, and other similar computing apparatuses. The components shown herein, connections and relations thereof, and functions thereof are only examples, and are not intended to limit the implementation of the present disclosure described and/or claimed herein.

FIG. 6 shows a schematic block diagram of an exemplary electronic device 600 that may be configured to implement the embodiments of the present disclosure. The electronic device is intended to represent various forms of digital computers, such as laptop computers, desktop computers, workstations, personal digital assistants, servers, blade servers, mainframe computers and other suitable computers. The electronic device may also represent various forms of mobile devices, such as personal digital processing, a cellular phone, a smart phone, a wearable device, and other similar computing devices. The components shown herein, their connections and relationships, and their functions are merely examples, and are not intended to limit the implementation of the present disclosure described and/or required herein.

As shown in FIG. 6, the device 600 may include a computing component 601 which may execute various suitable actions and processes according to a computer program stored in a read-only memory (ROM) 602 or loaded into a random-access memory (RAM) 603 from a storage component 608. In the RAM 603, various programs and data required for operations of the device may also be stored. The computing component 601, the ROM 602 and the RAM 603 are connected to each other by means of a bus 604. An input/output (I/O) interface 605 is also connected to the bus 604.

Multiple components in the device 600 are connected to the I/O interface 605, and may include: an input component 606 such as a keyboard and a mouse; an output component 607 such as various types of displays and speakers; a storage component 608 such as a magnetic disk and an optical disk; and a communication component 609 such as a network card, a modem and a wireless communication transceiver. The communication component 609 allows the device 600 to exchange information/data with other devices via computer networks such as the internet and/or various telecommunication networks.

The computing component 601 may be various general and/or special processing assemblies having processing and computing abilities. Some examples of the computing component 601 include, but are not limited to, a central processing units (CPU), a graphics processing unit (GPU), various special artificial intelligence (AI) computing chips, various computing components that run machine learning model algorithms, digital signal processors (DSPs) and any suitable processors, controllers, microcontrollers, etc. The computing unit 601 executes the various methods and processes described above, such as a method for obtaining multiple object operators of an object model. For example, in some embodiments, the method for performing the graph convolution on multiple encoding results respectively to obtain multiple convolution results may be implemented as a computer software program, which is tangibly contained in a machine-readable medium, such as the storage component 608. In some embodiments, part or all of the computer programs may be loaded and/or installed on the device 600 via the ROM 602 and/or the communication unit 609. When the computer program is loaded into the RAM 603 and executed by the computing component 601, at least one of the step of the above method for performing the graph convolution on multiple encoding results respectively to obtain multiple convolution results may be executed. Alternatively, in other embodiments, the computing unit 601 may be configured to execute the method for carrying out graph convolution on multiple encoding results respectively to obtain multiple convolution results in any other suitable mode (for example, by means of firmware).

Various implementations of the systems and technique described above herein may be implemented in a digital electronic circuit system, an integrated circuit system, a field programmable gate array (FPGA), an application specific integrated (ASIC), an application specific standard product (ASSP), a system on a chip (SOC), a load programmable logic device (CPLD), computer hardware, firmware, software, and/or combinations thereof. These various embodiments may be implemented in at least one computer program. The at least one computer program may be executed and/or interpreted on a programmable system including at least one programmable processor. The programmable processor may be a special or general programmable processor, and may receive data and instructions from a storage system, at least one input devices, and at least one output device, and transmit data and instructions to the storage system, the at least one input apparatus and the at least one output device.

Program codes for implementing the method of the present disclosure may be written in any combination of at least one programming language. These program codes may be provided to at least one processor or controller of at least one general computer, at least one special computer or other programmable data processing apparatus such that the program code, when executed by the at least one processor or controller, the functions/operations specified in the flowcharts and/or a block diagrams to be implemented. The program codes can be entirely or partly executed on the machine, partly executed on the machine as an independent software package, and partly executed on a remote machine, or entirely executed on the remote machine or a server.

In the context of the present disclosure, a machine-readable medium may be a tangible medium, which may contain or store at least one program for being used by at least one instruction execution system, apparatus or device or combination with the instruction execution system, apparatus or device. The machine-readable medium may be a machine-readable signal medium or a machine-readable storage medium. The machine-readable medium may include, but is not limited to, electronic, magnetic, optical, electromagnetic, infrared or semiconductor systems, apparatuses or devices, or any suitable combination of the above.

More specific examples of the machine-readable storage medium may include an electrical connection based on at least one wire, a portable computer disk, a hard disk, a random-access memory (RAM), a read-only memory (ROM), an erasable programmable read-only memory (EPROM or a flash memory), an optical fiber, a compact disk read-only memory (CD-ROM), an optical storage device, a magnetic storage device or any suitable combination of the foregoing.

In order to provide interaction with users, the systems and technologies described herein may be implemented on a computer that has: a display apparatus for displaying information to the users (for example, a cathode ray tube (CRT) or a liquid crystal display (LCD) monitor); and a keyboard and a pointing apparatus (such as a mouse or a trackball) through which the users can provide inputs to the computer. Other types of devices can also be used to provide interaction with the user. For example, a feedback provided to the user can be any form of sensory feedback (for example, visual feedback, auditory feedback, or tactile feedback), and the inputs from the user can be received in any form (including sound input, speech input, or tactile input).

In order to provide interaction with users, the systems and technologies described here can be implemented on a computer that has: a display apparatus for displaying information to the users (for example, a cathode ray tube (CRT) or a liquid crystal display (LCD) monitor); and a keyboard and a pointing apparatus (such as a mouse or a trackball) through which the users can provide inputs to the computer. Other types of devices can also be used to provide interaction with the user. For example, a feedback provided to the user can be any form of sensory feedback (for example, visual feedback, auditory feedback, or tactile feedback), and the inputs from the user can be received in any form (including sound input, speech input, or tactile input).

The systems and technologies described herein can be implemented in a computing system that includes a background component (for example, as a data server), or a computing system that includes a middleware component (for example, an application server), or a computing system that includes a front-end component (for example, a user computer with a graphical user interface or a web browser through which the user can interact with the implementation mode of the system and technologies described herein), or a computing system that includes any combination of the background component, the middleware component, or the front-end component. The components of the system can be connected to each other through any form or medium of digital data communication (for example, a communication network). Examples of communication networks include: a local area network (LAN), a wide area network (WAN), and an Internet.

The computer system can include at least one client and at least one server. The at least one client and the at least one server are generally far away from each other and usually interact through a communication network. A relationship between the at least one client and the at least one server is generated by at least one computer program running on corresponding at least one computer and having a client-server relationship with each other. The server can be a cloud server or a server of a distributed system or a server combined with a blockchain.

It should be understood that the various forms of flows shown above can be used to reorder, add or delete steps. For example, the steps described in the present disclosure may be executed in parallel, sequentially or in a different order, as long as the desired results of the technical solutions disclosed in the present disclosure can be achieved. This is not limited herein.

The above-mentioned specific implementations do not constitute a limitation on the protection scope of the present disclosure. Those skilled person in the art should understand that various modifications, combinations, sub-combinations and substitutions may occur depending on design requirements and other factors. Any modification, equivalent replacement and improvement made within the spirit and principle of the present disclosure shall all fall within the protection scope of the present disclosure.

What is claimed is:

1. A method for recognizing a receipt, comprising:
acquiring a target receipt to be recognized, wherein the target receipt comprises a plurality of text blocks;
encoding two-dimensional position information of the plurality of text blocks on the target receipt respectively, to obtain a plurality of encoding results, wherein the plurality of encoding results are corresponding to the plurality of text blocks in a one-to-one manner;
performing graph convolution on the plurality of encoding results respectively, to obtain a plurality of convolution results, wherein the plurality of convolution results are corresponding to the plurality of encoding results in a one-to-one manner; and
recognizing each of the plurality of convolution results based on a first conditional random field model, to obtain a first prediction result at text block-level of the target receipt, wherein the first conditional random field model and a second conditional random field model are co-trained, and the second conditional random field model is configured to recognize each of the plurality of convolution results, so as to obtain a second prediction result at token-level of the target receipt.

2. The method as claimed in claim 1, wherein each of the encoding results comprises a first hidden layer vector at token-level of a corresponding text block, and the recognizing each of the plurality of convolution results based on a first conditional random field model, to obtain a first prediction result at text block-level of the target receipt comprises:
transforming a sum of each of the plurality of convolution results at token-level and a corresponding first hidden layer vector into a corresponding second hidden layer vector at token-level;
determining a first text block vector of each of the plurality of text blocks based on the corresponding second hidden layer vector; and
recognizing the first text block vector of each of the plurality of text blocks based on the first conditional random field model, to obtain the first prediction result.

3. The method as claimed in claim 2, further comprising:
recognizing the second hidden layer vector based on the second conditional random field model, to obtain the second prediction result.

4. The method as claimed in claim 1, further comprising:
training based on a first loss function of the first conditional random field model and a second loss function of the second conditional random field model, to obtain the first conditional random field model.

5. The method as claimed in claim 4, wherein the training based on a first loss function of the first conditional random field model and a second loss function of the second conditional random field model, to obtain the first conditional random field model comprises:
obtaining a sum of the first loss function and the second loss function of the second conditional random field model; and
training based on the sum to obtain the first conditional random field model.

6. The method as claimed in claim 1, wherein the two-dimensional position information comprises two-dimensional coordinates of each of the plurality of text blocks on the target receipt, wherein the encoding two-dimensional position information of the plurality of text blocks on the target receipt respectively, to obtain a plurality of encoding results comprises:
determining a target coordinate vector corresponding to the two-dimensional coordinates of each of the plurality of text blocks; and
encoding the target coordinate vector, to obtain each of the plurality of encoding results.

7. The method as claimed in claim 6, wherein the two-dimensional coordinates comprise a first two-dimensional coordinate of a first corner and a second two-dimensional coordinate of a second corner of a text box of each of the plurality of text blocks, and the first corner and the second corner are located on a diagonal line of the text box, wherein the determining a target coordinate vector corresponding to the two-dimensional coordinates of each of the multiple text blocks comprises:
determining a first coordinate vector corresponding to the first two-dimensional coordinate and a second coordinate vector corresponding to the second two-dimensional coordinate; and
determining a sum of the first coordinate vector and the second coordinate vector as the target coordinate vector.

8. The method as claimed in claim 6, wherein the method further comprises:
adjusting an vector dimension of the target coordinate vector from an original vector dimension to a target vector dimension based on size information of each of the plurality of text blocks, wherein the target vector dimension is greater than the original vector dimension;
wherein the encoding the target coordinate vector, to obtain each of the plurality of encoding results comprises: encoding the target coordinate vector of the target vector dimension, to obtain each of the plurality of encoding results.

9. The method as claimed in claim 8, wherein the method further comprises:
transforming each of the plurality of text blocks into a token-level vector; and
the encoding the target coordinate vector of the target vector dimension to obtain each of the plurality of encoding results comprises: encoding the token-level vector and the target coordinate vector of the target vector dimension, to obtain each of the plurality of encoding results.

10. The method as claimed in claim 9, wherein the method further comprises:
encoding a sub-image corresponding to each of the plurality of text blocks, to obtain a sub-image vector of each of the plurality of text blocks; and
adjusting an vector dimension of the sub-image vector from the original vector dimension to the target vector dimension;
wherein the encoding the token-level vector and the target coordinate vector of the target vector dimension, to obtain each of the plurality of encoding results comprises: encoding the sub-image vector of the target vector dimension, the token-level vector and the target coordinate vector of the target vector dimension, to obtain each of the plurality of encoding results.

11. The method as claimed in claim 10, wherein each of the encoding results comprises a first hidden layer vector at token-level of a corresponding text block, wherein the encoding the sub-image vector of the target vector dimension, the token-level vector and the target coordinate vector of the target vector dimension, to obtain each of the plurality of encoding results comprises:
   transforming a sum of the sub-image vector of the target vector dimension, the token-level vector, and the target coordinate vector of the target vector dimension into the first hidden layer vector at token-level of the corresponding text block.

12. The method as claimed in claim 1, wherein each of the encoding results comprises a first hidden layer vector at token-level of a corresponding text block, wherein the performing graph convolution on the plurality of encoding results respectively, to obtain a plurality of convolution results comprises:
   determining a second text block vector of each of the plurality of text blocks based on a corresponding first hidden layer vector; and
   performing the graph convolution on the second text block vector of each of the plurality of text blocks, to obtain each of the plurality of convolution results.

13. An electronic device, comprising:
   at least one processor; and
   a memory in communication connection with the at least one processor, wherein
   the memory stores at least one instruction capable of being executed by the at least one processor, and the at least one instruction is performed by the at least one processor, so as to enable the at least one processor to perform the following steps:
   acquiring a target receipt to be recognized, wherein the target receipt comprises a plurality of text blocks;
   encoding two-dimensional position information of the plurality of text blocks on the target receipt respectively, to obtain a plurality of encoding results, wherein the plurality of encoding results is corresponding to the plurality of text blocks in a one-to-one manner;
   performing graph convolution on the plurality of encoding results respectively, to obtain a plurality of convolution results, wherein the plurality of convolution results are corresponding to the plurality of encoding results in a one-to-one manner; and
   recognizing each of the plurality of convolution results based on a first conditional random field model, to obtain a first prediction result at text block-level of the target receipt, wherein the first conditional random field model and a second conditional random field model are co-trained, the second conditional random field model is configured to recognize each of the plurality of convolution results, so as to obtain a second prediction result at token-level of the target receipt.

14. The electronic device as claimed in claim 13, wherein each of the encoding results comprises a first hidden layer vector at token-level of a corresponding text block, and the recognizing each of the plurality of convolution results based on a first conditional random field model, to obtain a first prediction result at text block-level of the target receipt comprises:
   transforming a sum of each of the plurality of convolution results at token-level and a corresponding first hidden layer vector into a corresponding second hidden layer vector at token-level;
   determining a first text block vector of each of the plurality of text blocks based on the corresponding second hidden layer vector; and
   recognizing the first text block vector of each of the plurality of text blocks based on the first conditional random field model, to obtain the first prediction result.

15. The electronic device as claimed in claim 14, wherein the at least one instruction is performed by the at least one processor, so as to enable the at least one processor to further perform the following step:
   recognizing the second hidden layer vector based on the second conditional random field model, to obtain the second prediction result.

16. The electronic device as claimed in claim 13, wherein the at least one instruction is performed by the at least one processor, so as to enable the at least one processor to further perform the following step:
   training based on a first loss function of the first conditional random field model and a second loss function of the second conditional random field model, to obtain the first conditional random field model.

17. A non-transitory computer-readable storage medium which stores a computer instruction, wherein the computer instruction is configured to enable a computer to perform the following steps:
   acquiring a target receipt to be recognized, wherein the target receipt comprises a plurality of text blocks;
   encoding two-dimensional position information of the plurality of text blocks on the target receipt respectively, to obtain a plurality of encoding results, wherein the plurality of encoding results is corresponding to the plurality of text blocks in a one-to-one manner;
   performing graph convolution on the plurality of encoding results respectively, to obtain a plurality of convolution results, wherein the plurality of convolution results are corresponding to the plurality of encoding results in a one-to-one manner; and
   recognizing each of the plurality of convolution results based on a first conditional random field model, to obtain a first prediction result at text block-level of the target receipt, wherein the first conditional random field model and a second conditional random field model are co-trained, the second conditional random field model is configured to recognize each of the plurality of convolution results, so as to obtain a second prediction result at token-level of the target receipt.

18. The non-transitory computer-readable storage medium as claimed in claim 17, wherein each of the encoding results comprises a first hidden layer vector at token-level of a corresponding text block, and the recognizing each of the plurality of convolution results based on a first conditional random field model, to obtain a first prediction result at text block-level of the target receipt comprises:
   transforming a sum of each of the plurality of convolution results at token-level and a corresponding first hidden layer vector into a corresponding second hidden layer vector at token-level;
   determining a first text block vector of each of the plurality of text blocks based on the corresponding second hidden layer vector; and recognizing the first text block vector of each of the plurality of text blocks based on the first conditional random field model, to obtain the first prediction result.

19. The non-transitory computer-readable storage medium as claimed in claim 18, wherein the computer instruction is configured to enable the computer to further perform the following step:

recognizing the second hidden layer vector based on the second conditional random field model, to obtain the second prediction result.

20. The non-transitory computer-readable storage medium as claimed in claim 17, wherein the computer instruction is configured to enable the computer to further perform the following step:

training based on a first loss function of the first conditional random field model and a second loss function of the second conditional random field model, to obtain the first conditional random field.

* * * * *